(12) United States Patent
Zhou et al.

(10) Patent No.: US 11,501,032 B2
(45) Date of Patent: Nov. 15, 2022

(54) SURFACE DEVELOPABILITY CONSTRAINT FOR DENSITY-BASED TOPOLOGY OPTIMIZATION

(71) Applicants: Toyota Motor Engineering & Manufacturing North America, Inc., Plano, TX (US); The Regents of The University of Michigan, Ann Arbor, MI (US)

(72) Inventors: Yuqing Zhou, Ann Arbor, MI (US); Tsuyoshi Nomura, Novi, MI (US); Kazuhiro Saitou, Ann Arbor, MI (US)

(73) Assignees: Toyota Motor Engineering & Manufacturing North America, Inc., Plano, TX (US); The Regents of the University of Michigan, Ann Arbor, MI (US)

( * ) Notice: Subject to any disclaimer, the term of this patent is extended or adjusted under 35 U.S.C. 154(b) by 169 days.

(21) Appl. No.: 16/778,082

(22) Filed: Jan. 31, 2020

(65) Prior Publication Data

US 2021/0240880 A1 Aug. 5, 2021

(51) Int. Cl.
| | |
|---|---|
| *G06F 30/17* | (2020.01) |
| *G06F 30/20* | (2020.01) |
| *G06F 17/16* | (2006.01) |
| *G06T 17/10* | (2006.01) |
| *G06F 17/13* | (2006.01) |

(Continued)

(52) U.S. Cl.
CPC .............. *G06F 30/17* (2020.01); *G06F 3/00* (2013.01); *G06F 17/11* (2013.01); *G06F 17/16* (2013.01);
(Continued)

(58) Field of Classification Search
CPC . G06F 30/17; G06F 30/20; G06F 3/00; G06F 17/11; G06F 17/16; G06F 17/13; G06F 30/23; G06F 2111/06; G06T 17/10
(Continued)

(56) References Cited

U.S. PATENT DOCUMENTS

| | | |
|---|---|---|
| 8,411,090 B2 | 4/2013 | Wang |
| 8,648,855 B2 | 2/2014 | Pedersen |

(Continued)

FOREIGN PATENT DOCUMENTS

WO 2017189064 11/2017

OTHER PUBLICATIONS

Nomura, Tsuyoshi, et al. "Topology Optimization Method with Vector Field Design Variables." R&D Rev Toyota CRDL 47.1 (2016). pp. 67-75. (Year: 2016).*

(Continued)

*Primary Examiner* — John E Johansen
(74) *Attorney, Agent, or Firm* — Christopher G. Darrow; Darrow Mustafa PC

(57) ABSTRACT

Methods are provided for designing a structure with developable surfaces using a surface developability constraint. The surface developability constraint is developed based on the discovery of a sufficient condition for surface piecewise developability, namely surface normal directions lie on a small, finite number of planes. Automated methods and algorithms may include providing a design domain and a characteristic function of a material in the design domain to be optimized. The methods include defining a nodal density of the material, and determining surface normal directions of a plurality of planes. A density gradient that describes the surface normal directions is then determined. The methods include performing a topology optimization process on the design domain using a surface developability constraint that is based, at least in part, on the characteristic function. A geometric domain is then created for the structure using results from the topology optimization.

17 Claims, 11 Drawing Sheets

(51) Int. Cl.
  *G06F 17/11* (2006.01)
  *G06F 3/00* (2006.01)
  *G06F 30/23* (2020.01)
  *G06F 111/06* (2020.01)

(52) U.S. Cl.
  CPC .............. *G06F 30/20* (2020.01); *G06F 30/23* (2020.01); *G06T 17/10* (2013.01); *G06F 17/13* (2013.01); *G06F 2111/06* (2020.01)

(58) Field of Classification Search
  USPC .......................................................... 703/7
  See application file for complete search history.

(56) References Cited

U.S. PATENT DOCUMENTS

| | | | |
|---|---|---|---|
| 9,619,587 | B2 | 4/2017 | Griffith et al. |
| 2021/0004719 | A1* | 1/2021 | Dupont De Dinechin .................. G06N 3/0472 |
| 2021/0263498 | A1* | 8/2021 | Bandara ................. B33Y 10/00 |

OTHER PUBLICATIONS

Allaire, Grégoire, et al. "Structural optimization under overhang constraints imposed by additive manufacturing technologies." Journal of Computational Physics 351 (2017). pp. 295-328. (Year: 2017).*

Wang, S. Y., et al. "An extended level set method for shape and topology optimization." Journal of Computational Physics 221.1 (2007). pp. 395-421. (Year: 2007).*

Gao, Jie, et al. "Topology optimization for auxetic metamaterials based on isogeometric analysis." Computer Methods in Applied Mechanics and Engineering 352 (2019). pp. 211-236. (Year: 2019).*

Solomon, J. et al., "Flexible Developable Surfaces", Eurographics Symposium on Geometry Processing, vol. 31, No. 5(2012) pp. 1567-1576.

Tang, C. et al., "Interactive Design of Developable Surfaces", ACM Trans. Graph. vol. 35, No. 2, Article 12 (2015) 12 pages.

Stein, O. et al., "Developability of Triangle Meshes", ACM Trans. Graph. vol. 37, No. 4, Article 77 (2018) 14 pages.

* cited by examiner

FIG. 13A
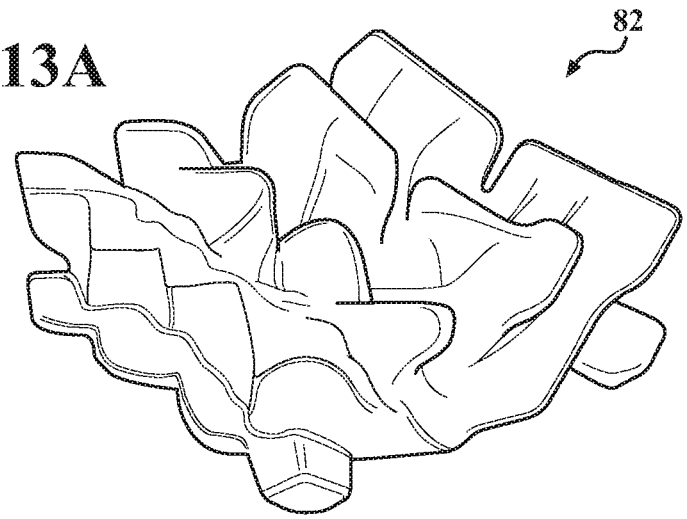
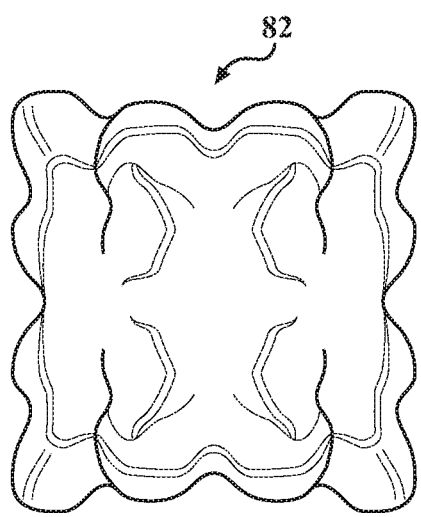
FIG. 13B
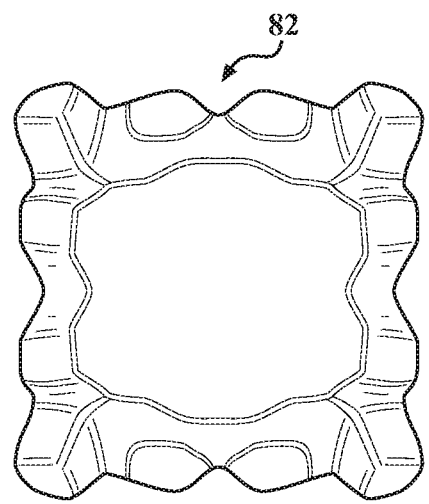
FIG. 13C
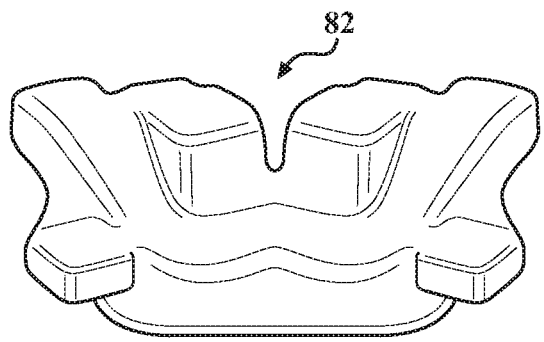
FIG. 13D

SURFACE DEVELOPABILITY CONSTRAINT FOR DENSITY-BASED TOPOLOGY OPTIMIZATION

TECHNICAL FIELD

The present disclosure generally relates to objects with developable surfaces, and, more particularly, to providing density-based topology optimization methods and algorithms that are used to design an object with developable surfaces.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

A developable structure is a spatial object that has boundary surfaces that can be made of only planar sheets, without stretching and tearing. Developable surfaces of the developable structure may include patches of planar surfaces, cylinders, cones, and tangent surfaces. When a surface has its surface normal directions lie on the same plane, it is a developable surface. When a surface has its surface normal directions lie on a small, finite number of planes, it is a piecewise developable surface.

State-of-the-art development of developable structures has focused on either an automatic conversion of a given geometry, or a user-guided manual design. With the automatic conversion of a given geometry to developable pieces, the technology generally focused on parametric (spline) or non-parametric (mesh) input geometries. However, because these automatic conversion techniques require the input geometries at the outset, they are primarily useful for post-processing of already completed designs and not for design exploration or design creation. User-guided interactive design improves the speed, allowing real-time conversion by interpolating surfaces from user-specified boundaries. However, the design process requires manual intervention by a human designer.

Accordingly, it would be desirable to provide an improved, more automated control of designing solid volumetric structures based on target specifications and requirements.

SUMMARY

This section provides a general summary of the disclosure, and is not a comprehensive disclosure of its full scope or all of its features.

In various aspects, the present teachings provide a method for designing a structure with developable surfaces using a surface developability constraint. Automated methods and algorithms may include providing a design domain and a characteristic function of a material in the design domain to be optimized. The methods include defining a nodal density of the material, and determining surface normal directions of a plurality of planes. A density gradient that describes the surface normal directions is then determined. The methods include performing a topology optimization process on the design domain using a surface developability constraint that is based, at least in part, on the characteristic function. A geometric domain is then created for the structure using results from the topology optimization.

In other aspects, the present teachings provide a non-transitory computer readable medium including instructions that, when executed, perform an automated method of for designing a structure with developable surfaces using a surface developability constraint. The instructions include receiving a design domain and a characteristic function of a material in the design domain to be optimized. A nodal density of the material is defined, and the instructions include determining surface normal directions of a plurality of planes. A density gradient that describes the surface normal directions is determined. The instructions include performing a topology optimization process on the design domain using a surface developability constraint that is based, at least in part, on the characteristic function. A geometric domain is then created for the structure using results from the topology optimization.

In still other aspects, the present teachings provide solid volumetric structures, thin-walled structures, and various articles of manufacture made according to the methods disclosed herein.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIGS. 13A-13D illustrate an alternate improved optimized structure for the thermal design example.

Figure 1:
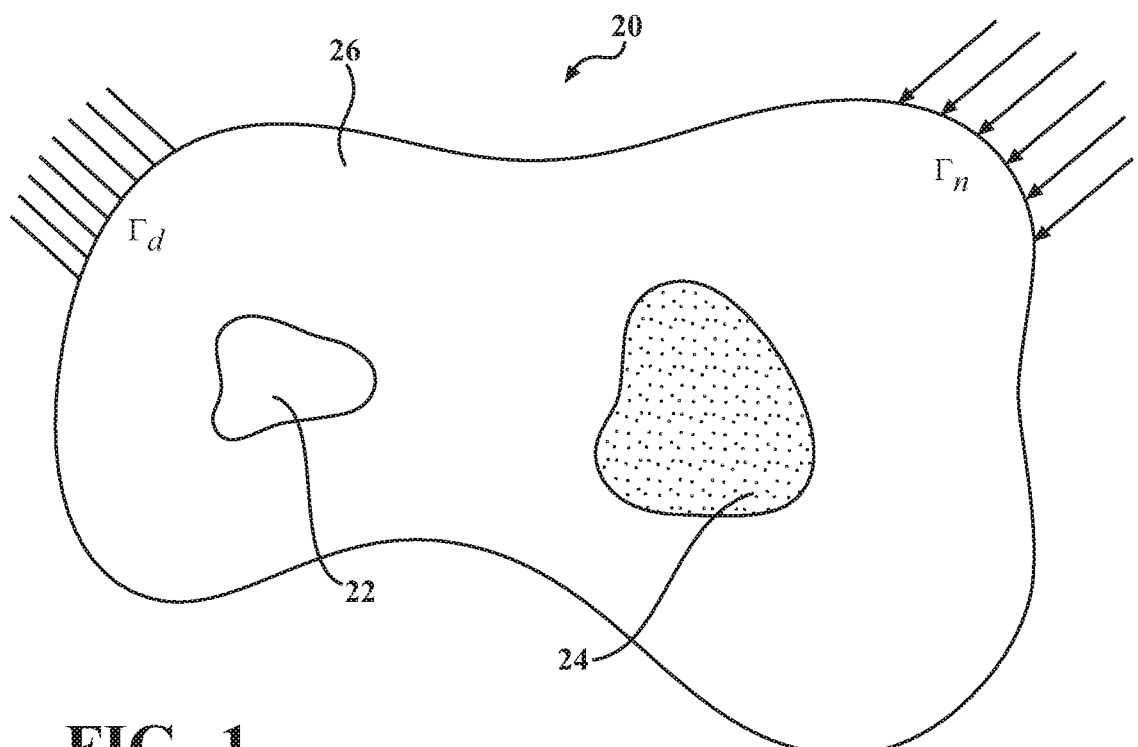
FIG. 1 is an exemplary topology optimization problem presented in a generic form provided in order to explain various aspects of the present technology.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides density-based topology optimization methods and algorithms with a surface developability constraint that is used as a mathematical framework for obtaining an automated design of thin-walled or solid volumetric structures. In this regard, the present technology is configured for developing a free-form geometric design of a thin-walled or solid volumetric structure with developable surfaces. In various aspects, the design may be based on various pre-defined performance targets, including packaging requirements, design specifications, and the like.

In various aspects, the present teachings provide a method for designing a structure with developable surfaces using a surface developability constraint. The surface developability constraint is developed based on the discovery of a sufficient condition for surface piecewise developability, namely surface normal directions lie on a small, finite number of planes. Automated methods and algorithms may include providing a design domain and a characteristic function of a material in the design domain to be optimized. The methods include defining a nodal density of the material, and determining surface normal directions of a plurality of planes. A density gradient that describes the surface normal directions is then determined. The methods include performing a topology optimization process on the design domain using a surface developability constraint that is based, at least in part, on the characteristic function. A geometric domain is then created for the structure using results from the topology optimization. The present teachings also provide a non-transitory computer readable medium including instructions that, when executed, perform the automated method of for designing a structure with developable surfaces using a surface developability constraint.

As is generally known in the art, developable structures are increasingly of considerable significance for architecture and engineering designs, and are particularly significant for assisting in the design of various thin-walled structures. For example, designers and engineers may use sheet-metal as a developable structure for vehicle exteriors; airplane components, such as wings; and shipping vessel components, such as boat hulls. Fabric may be used as a developable structure for clothing and shoes. Similarly, paper is used as a developable structure for origami and paper craft art; cardboard is used for packaging; and the like. Developable structures may also be made using additive manufacturing techniques, such as 3-D printing.

In other aspects, developable structures are also important for solid volumetric structures manufactured by machining, such as using flank milling techniques. Still further, solid volumetric structures with developable surfaces have engineering relevance with computer-aided design (CAD), computer animation and design, and various other entertainment purposes. Generally, any surface whose Gaussian curvature vanishes at every point can be constructed by bending a planar region. These are known to mathematicians as developable surfaces. The sheet-metal, fabric, and paper, noted above, are approximately unstretchable, and can be flattened onto a planar domain without stretching or tearing. The length of any curve drawn on such a surface remains the same, and the area of the developable surface should also remain the same.

As is known in the art, topology optimization is a mathematical method that optimizes a material layout within a specific design space, and can be based on a particular pre-defined set of loads, boundary conditions, and constraints, in order to maximize the performance of a specific system. With the present technology, topology optimization is generally a method for computationally designing volumetric solid structures by optimally distributing materials within a prescribed design domain. This optimization is useful in the initial and early phases of the design process in order to predict an optimal material distribution within a given initial design space of a structure. In various aspects, functional specifications and manufacturing constraints can be used as considerations and boundary conditions for topology optimization. Unlike sizing and shape optimization, which are based on parametric geometry representations, topology optimization describes geometries non-parametrically. This facilitates innovative designs through the exploration of arbitrary shapes.

In general, the surfaces of the volumetric solids generated by the conventional topology optimization techniques are not developable. Thus, in order to focus and limit the exploration space to the geometries with developable surfaces, the methods of the present technology introduce at least one constraint on surface developability. In various aspects, this constraint may specifically enforce the feature that surface normal directions are to lie on a prescribed finite number of planes. While this constraint generally allows for the exploration of a subset of solids with developable surfaces, it is computationally efficient compared to a more generic constraint based on Gaussian curvature, making it highly suitable for use with topology optimization.

Due to its non-parametric geometry representation, topology optimization can provide the ultimate shape exploration design freedom. In addition to classic mechanics problems and heat transfer issues that play a role in designs, specific examples of which are provided below, the topology optimization methods of the present technology can also be applied to a variety of other applications with designs that have various functional specifications, characteristic functions, and manufacturing constraints that need to be tailored for each design. Non-limiting technologies where this technology is useful include turbulent flow problems, electromagnetic designs, unique or complicated architectural features, and the design and creation of micro-systems.

In various aspects, the present technology can be broadly established on a density-based Solid Isotropic Material with Penalization (SIMP) method framework. In various aspects, the SIMP method can be used to predict an optimal material distribution that is provided within a given design space, for one or more given load cases, boundary conditions, manufacturing constraints, performance requirements, and the like.

For a better understanding of the present technology, initial reference is made to FIG. 1, which provides a topology optimization problem in a very generic form. For example, a prescribed design domain D, generally referred to by reference number 20, is provided with a first region 22 that is void area, having no material, a second region 24 including a material, and a design point 26. In one example, under given boundary conditions for a mechanics model with a displacement boundary condition on $\Gamma_d$ and traction boundary condition on $\Gamma_n$, the problem may be to optimize a performance target, such as structural stiffness. This may be accomplished by specifying the existence of materials in each design point, for example, that are subject to certain physics equilibriums and additional constraints, such as a weight limit.

In a density-based SIMP framework useful with the present technology, the existence of materials is represented by a nodal density, $\rho$. The relative nodal density, $\rho$, may be provided ranging between zero (0) and 1, where a value of zero (0) indicates a void and a value of 1 indicates presence of a solid material. While the nodal density, $\rho$, is a continuous variable that may be required for efficient gradient-based optimization, near-discrete final designs with $\rho$ being either zero (0) or 1 can be enforced through a penalization scheme, where the intermediate densities are penalized for inefficient use of materials based on the corresponding physics system. The governing physics is often solved by a finite element method, and the iterations of the gradient-based optimization can be guided by an adjoint sensitivity analysis.

As noted above, developable surfaces can consist of a number of patches of planar surfaces, cylinders, cones, and tangent surfaces. All of these patches share the same property that the Gaussian curvature is equal to zero (0) at any point. Therefore, zero Gaussian curvature is a necessary and sufficient condition for surface developability. The Gaussian curvature K of a surface at a point is the product of the principal curvatures $k_1$ and $k_2$: as provided in Equation (1):

$$K = k_1 \cdot k_2 \quad (1)$$

For an implicit surface S, the Gaussian curvature can also be calculated as provided in Equation (2):

$$K = \frac{\nabla S H^*(S) \nabla S^T}{|\nabla S|^4} \quad (2)$$

where $\nabla S$ is the gradient, and $H^*(S)$ is the adjoint of the Hessian. For density-based topology optimization, while the density spatial gradient can be computed and incorporated into Equation (2), the resulting numerical complexity may prevent it from being used in sensitivity-driven gradient-based optimization. To address the numerical complexity associated with the direct Gaussian curvature calculation, the present technology proposes an alternative, simpler criterion for surface developability based on only the surface normal (i.e., $\nabla S$).

When a surface has its surface normal directions lie on the same plane, it is a developable surface patch. Further, when a surface has its surface normal directions lie on a small, finite number of planes, it is a piecewise developable surface. Therefore, surface normal directions on a small, finite number of planes is a sufficient condition for piecewise developability. The condition proposed herein covers planar surfaces and cylinders whose normal directions lie on the same plane. However, cases of cones and tangent surfaces are not covered by the proposed condition because their normal directions do not lie on the same plane. Therefore, the proposed condition is not a necessary condition for general piecewise developability (i.e., locally zero Gaussian curvature). Since a large majority of developable surfaces consist only of planar and cylindrical surfaces, the present technology uses the above condition to construct a constraint for use with topology optimization. A more general condition that may potentially cover the entire exploration space of developability, including the cones and tangent surfaces, may be considered in future technology. It is expected, however, that the broader coverage may lead to increased numerical complexity for the constraint calculation.

With renewed reference to FIG. 1, in design domain D, a characteristic function $\chi$ can be defined to describe the material domain, $\Omega_d$, to be optimized as generally provided in Equation (3):

$$\chi(x) = \begin{cases} 0 & \text{for } \forall x \in D \setminus \Omega_d \\ 1 & \text{for } \forall x \in \Omega_d \end{cases} \quad (3)$$

where x stands for a design point in domain D and $\chi(x)$ is defined by a scalar function $\phi$ and the Heaviside function H such that the conditions of relationship (4) are met as follows:

$$\chi(x) = H(\phi(x)) \begin{cases} 0 & \text{for } \forall x \in D \setminus \Omega_d \\ 1 & \text{for } \forall x \in \Omega_d \end{cases} \quad (4)$$

To ensure the existence of solutions and the mesh-independent property, a Helmholtz PDE filter may then be used to regularize the scalar design variable, $\phi$, as provided in Equation (5):

$$-R^2 \nabla^2 \tilde{\phi} + \tilde{\phi} = \phi \quad (5)$$

where R is the filter radius. Then the density, $\rho$, can be defined by an additional smoothed Heaviside function $\tilde{H}$ as provided in Equation (6):

$$\rho \tilde{H}(\tilde{\phi}) \quad (6)$$

After a series of regularization from $\phi$ to $\tilde{\phi}$ to $\rho$, the resulting density, $\rho$, is bounded between zero (0) and 1.

With respect to the developability constraint, given planes can be described by directional vectors $v^{(1)}, v^{(2)}, \ldots v^{(K)}$, and the surface normal directions of the density variables can be computed as provided in Equation (7):

$$\nabla \tilde{\phi} = \left( \frac{\partial \tilde{\phi}}{\partial x}, \frac{\partial \tilde{\phi}}{\partial y}, \frac{\partial \tilde{\phi}}{\partial z} \right) \quad (7)$$

It is noted that the surface normal direction is not necessarily evaluated directly on $\rho$, rather it can be applied to $\tilde{\phi}$ for better numerical stability. Finally, the developability constraint can be summarized as follows in Equation (8):

$$\int_D \prod_{k=1}^{K} (v^{(k)} \cdot \nabla \tilde{\phi})^2 d\Omega = 0 \quad (8)$$

It should be understood that the above developability constraint is satisfied only if the surface normal direction (wherever it exists) is perpendicular to one of the directional vectors. When the surface normal direction does not exist (i.e., not on the surface or in void regions), $\nabla \tilde{\phi}$ equals to zero (0), and will not contribute to the developability constraint. Therefore, the developability constraint in Equation (8) is equivalent to evaluating the proposed sufficient condition for piecewise developability, as discussed above.

In various aspects, the present technology can be applicable as an optimized model with prescribed directional vectors, or as an optimized model with variable directional vectors. In order to provide an optimization model with prescribed directional vectors, and given K as prescribed directional vectors $v^{(1)}, v^{(2)}, \ldots v^{(K)}$, the overall optimization model can be summarized as to minimize a performance objective, F ($\phi$), which may be subject to a set of constraints, collectively provided as Equation Group (9):

$$\text{Minimize: } F(\phi) \tag{9}$$

Subject to:

$$g_1 := \int_D \rho d\Omega - \bar{V} \leq 0$$

$$g_2 := \int_D \prod_{k=1}^{K} (v^{(k)} \cdot \nabla \tilde{\phi})^2 d\Omega - \bar{\epsilon} \leq 0$$

$$\phi \in [-1, 1]^D$$

The performance objective, F depends on the corresponding physics system. Exemplary physics systems for mechanics and thermal systems will be discussed in more detail below. Notably, the first constraint $g_1$ poses a limit on the amount of available material, with $\bar{V}$ being the upper bound for the material volume. Constraint $g_2$ is the developability constraint. Constant K is the prescribed number of directional vectors, and $\bar{\epsilon}$ is an infinitesimal value.

With respect to an optimization model with variable directional vectors, as a relaxation of the optimization model presented above, directional vectors v(k) can be considered as design variables. To avoid the convergence to v(k)=(0, 0, 0), which is favored by the developability constraint, an additional constraint of $\|v(k)\| \geq 1$ can be introduced for each directional vector. The resulting optimization model can then be summarized as to minimize the performance objective, F ($\phi; v^{(1)}, v^{(2)}, \ldots v^{(K)}$), which may be subject to a set of constraints, collectively provided as Equation Group (10):

$$\text{Minimize: } F(\phi; v^{(1)}, v^{(2)}, \ldots v^{(K)}) \tag{10}$$

Subject to:

$$g_1 := \int_D \rho d\Omega - \bar{V} \leq 0$$

$$g_2 := \int_D \prod_{k=1}^{K} (v^{(k)} \cdot \nabla \tilde{\phi})^2 d\Omega - \bar{\epsilon} \leq 0$$

$$\phi \in [-1, 1]^D$$

$$\text{for } k = 1, 2, \ldots, K : g_3^{(k)} := 1 - \|v^{(k)}\| \leq 0$$

Since the developability constraint $g_2$ naturally favors a smaller $\|v^{(k)}\|$, the constraint $g_3^{(k)}$ ensures it converges to no less than 1 at the end of optimization.

Figure 2:
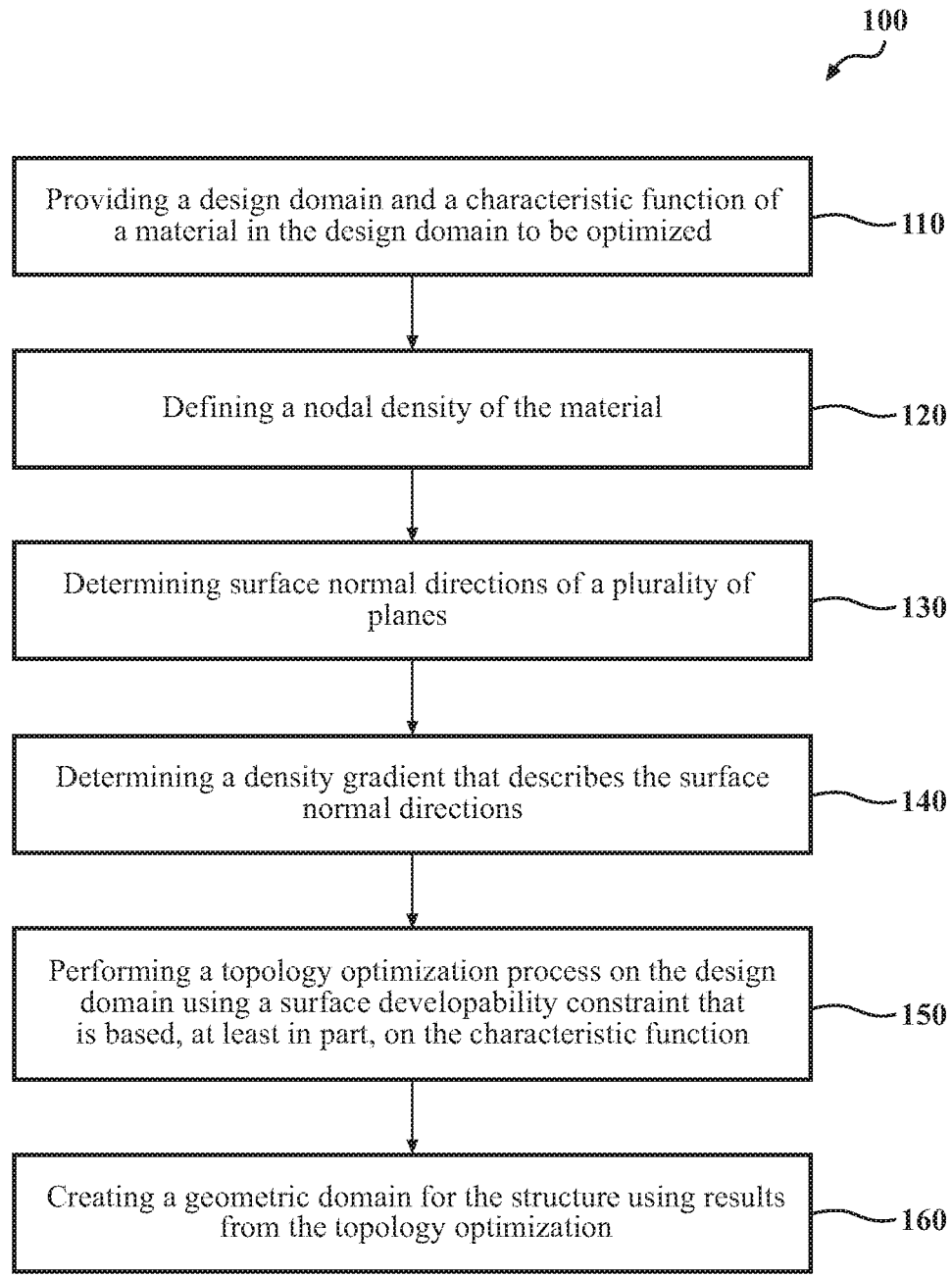
FIG. 2 is an exemplary flowchart depicting a process for designing a structure with developable surfaces using a surface developability constraint.

FIG. 2 is an exemplary flowchart depicting the above-described process 100 for designing a structure with developable surfaces using a surface developability constraint. As shown, the automated methods and algorithms may include providing a design domain and a characteristic function of a material in the design domain to be optimized, as indicated in method step 110. Method step 120 includes defining a nodal density of the material, which is followed by determining surface normal directions of a plurality of planes, shown in method step 130. A density gradient that describes the surface normal directions is then determined, shown in method step 140. With reference to method step 150, the present technology includes performing a topology optimization process on the design domain using a surface developability constraint that is based, at least in part, on the characteristic function. A geometric domain is then created for the structure using results from the topology optimization, shown in method step 160.

Design Examples

The present technology can be further explained using design examples, such as a mechanics system design example, and a thermal system design example. With the examples presented below, the optimization models in Equation Groupings (9) and (10) may be solved using the method of moving asymptotes (MMA). The physics equilibrium equations may be solved by a finite element method, and the sensitivity analysis by a standard adjoint method, both using COMSOL Multiphysics. The upper bound on allowable volume fraction is set as 35% for both examples. The density design variable is uniformly initialized so that the volume constraint $g_1$ is active. For these examples, the optimization terminates when the change in the objective function becomes sufficiently small, or a prescribed number of iterations is reached.

Mechanics Design Example

Figure 3:
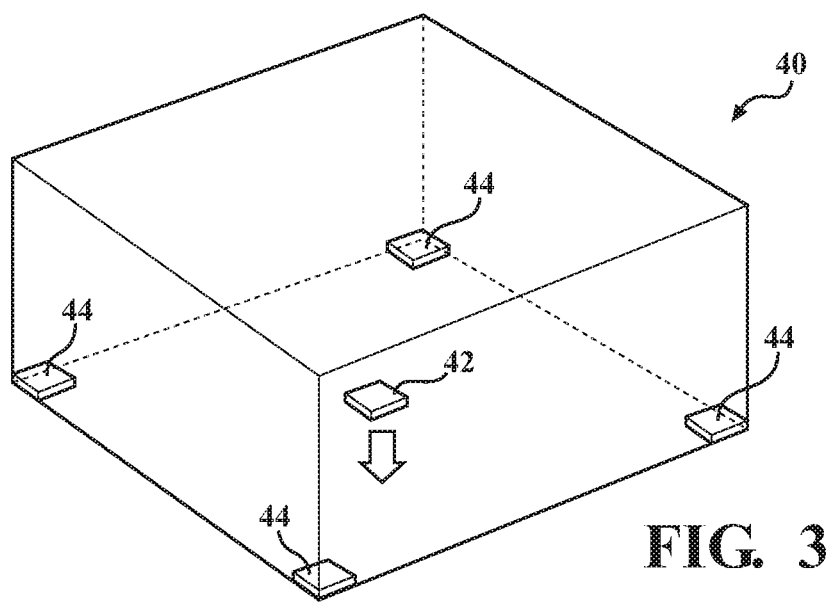
FIG. 3 is an exemplary design domain and boundary condition settings example for a linear elastic system.

This first example relates to the design of a linear elastic system whose boundary condition and the design domain are shown in FIG. 3. An exemplary dimension for the prescribed design domain, indicated by reference number 40, is 1.0 by 1.0 by 0.5. A unit force, as indicated by the arrow in FIG. 3, is applied to a center region of the bottom surface, indicated by reference number 42, provided with a relative dimension of 0.1 by 0.1. The four edge regions, indicated by reference number 44, are provided with a relative dimension of 0.1 by 0.1, and have a boundary condition that the regions 44 are fixed in all degrees of freedom. This mechanics design system is optimized for the minimum structural compliance under the constraint of a 35% solid elastic material volume fraction.

For this example, the objective function, F, is the structural compliance (provided as the reciprocal of structural stiffness), defined as $F = f^T u$, where f is the external force and u is the displacement. The displacement u may be obtained by solving the linear elasticity equilibrium equations collectively provided as Equation Group (11):

$$-\nabla \cdot \sigma = 0 \text{ in } D$$

$$u = 0 \text{ on } \Gamma_d$$

$$\sigma \cdot n = f \text{ on } \Gamma_n \tag{11}$$

where $\alpha = C \cdot \epsilon$ is the stress field, C is the elasticity tensor, and $\epsilon$ is the strain field. The domain $\Gamma_d$ is the Dirichlet boundary defined by zero prescribed displacement, and $\Gamma_n$ is the Neumann boundary defined by the normal n and the prescribed force f. The elasticity tensor, C, is an effective elasticity tensor whose relationship with the density is defined by the classic SIMP interpolation as provided in Equation (12):

$$C = \rho^P C_0 \tag{12}$$

where $C_0$ is the full elasticity tensor for the solid material and P is the penalization parameter for the SIMP power law.

Figure 4A:
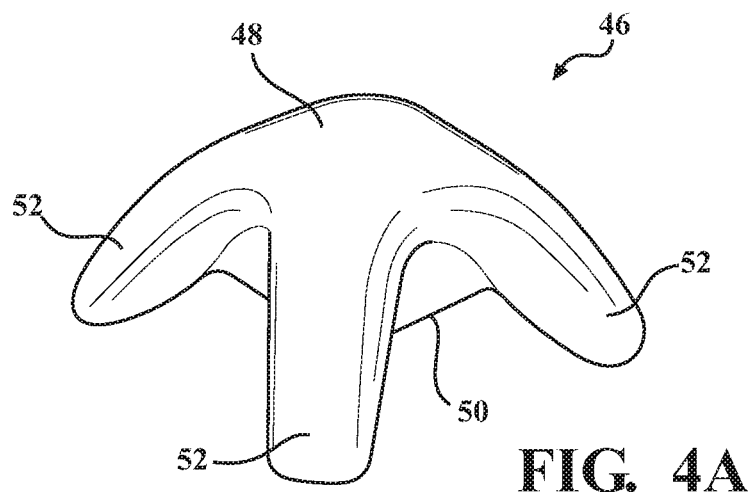
FIGS. 4A-4D illustrate an optimized structure using conventional topology optimization without any surface developability constraint of the present technology.
Figure 4B:
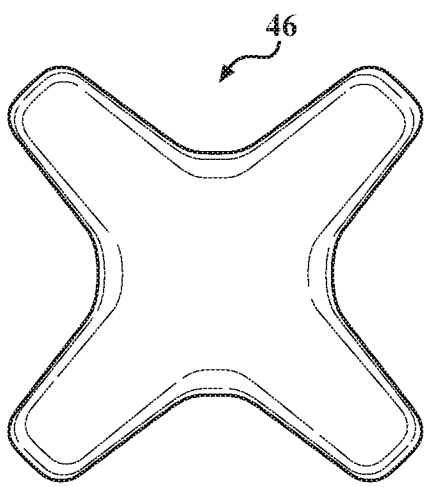
Figure 4C:
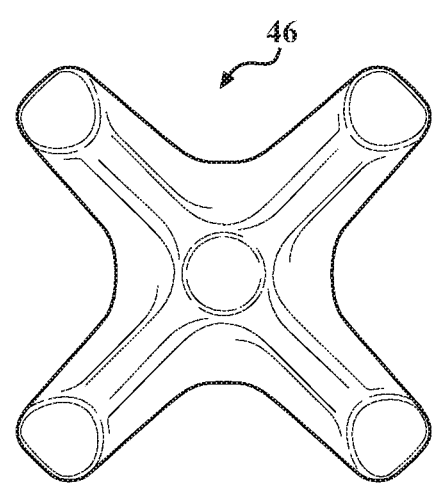
Figure 4D:
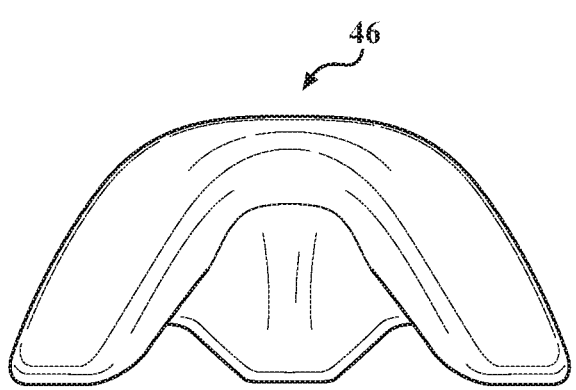
Figure 5A:
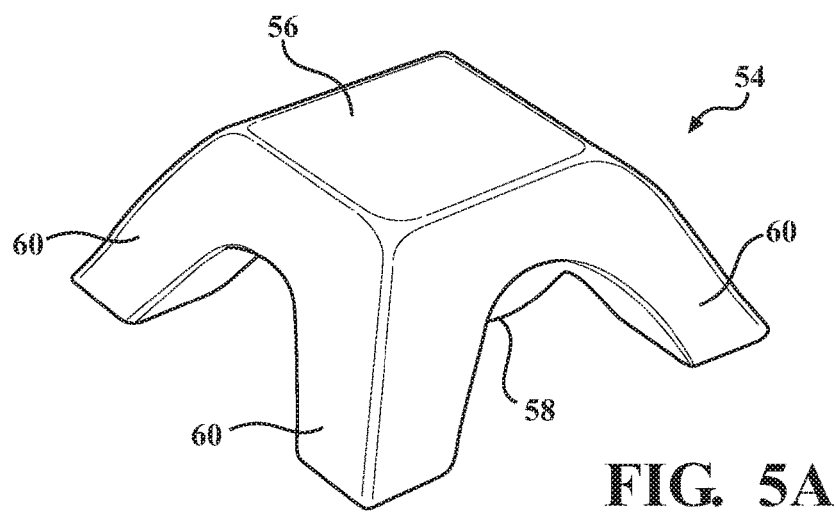
FIGS. 5A-5D illustrate an improved optimized structure of FIGS. 4A-4D using a surface developability constraint and prescribed directional vectors.
Figure 5B:
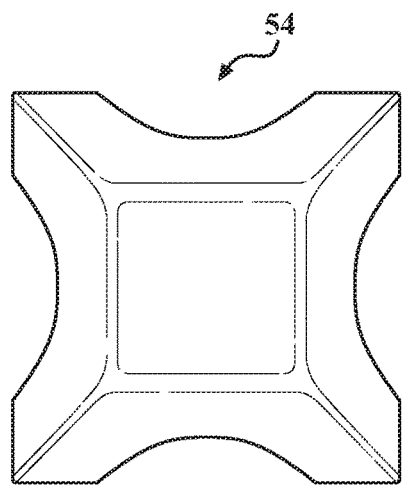
Figure 5C:
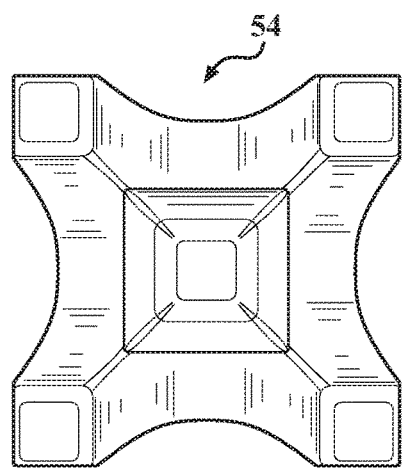
Figure 5D:
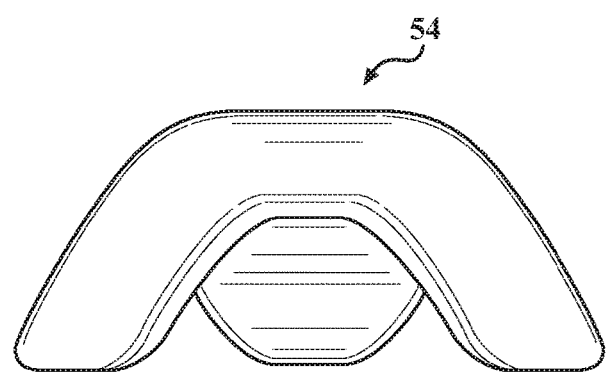

As a benchmark for this example, an optimized design using conventional topology optimization, without the developability constraint, is presented in FIGS. 4A-4D. FIG. 4A is a side perspective view of the structure 46 of the optimized design shown having what is referred to as a main body with an upper portion 48, lower portion 50, and a plurality of extending, curved legs 52. FIG. 4B is a top plan view; FIG. 4C is a bottom plan view; and FIG. 4D is a side plan view. The resulting structural compliance objective is 1.0 (normalized). By prescribing two directional vectors $v^{(1)}=(1, 0, 0)$ and $v^{(2)}=(0, 1, 0)$ that are fixed throughout the optimization, and solving Equation (9), the optimized design is presented in FIGS. 5A-5D, now with the developability constraint of the present technology. FIG. 5A is a side perspective view of the structure 54 of the optimized design shown having what is referred to as a main body with an upper portion 56, lower portion 58, and a plurality of extending legs 60. FIG. 5B is a top plan view; FIG. 5C is a bottom plan view; and FIG. 5D is a side plan view. Its normalized structural compliance objective is 1.04, namely a 4% performance degradation as compared with the benchmark design of FIGS. 4A-4D, without applying the developability constraint. To evaluate the effectiveness of the developability constraint, the structures of FIGS. 5A-5D validate that the surface normal directions are perpendicular to at least one of the prescribed directional vectors.

Figure 6A:
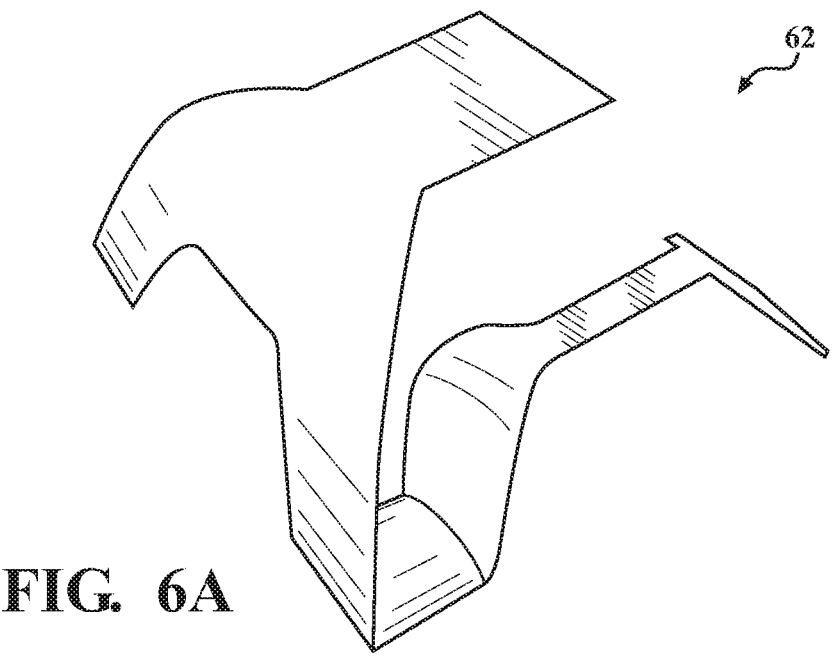
FIGS. 6A and 6B illustrate a 3-D patch being developed into a 2-D pattern using a flattening simulation tool.
Figure 6B:
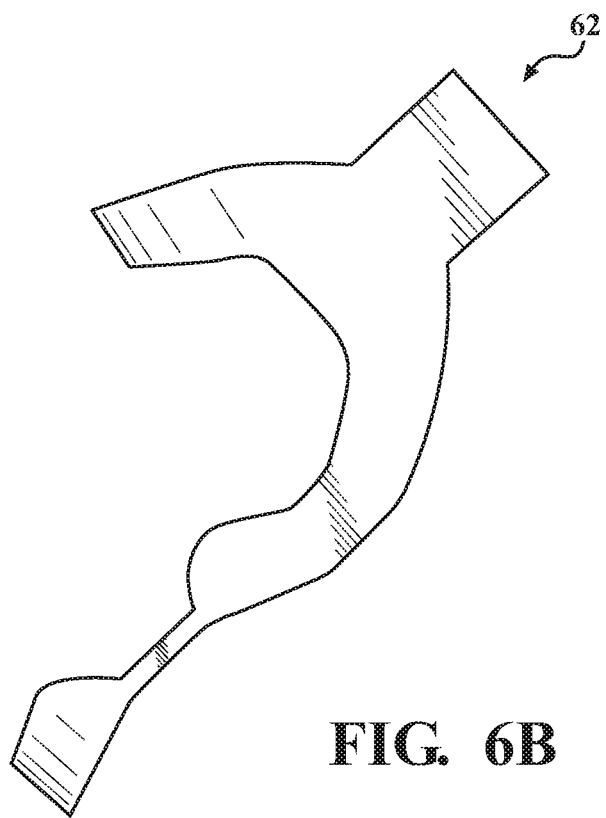
Figure 7:
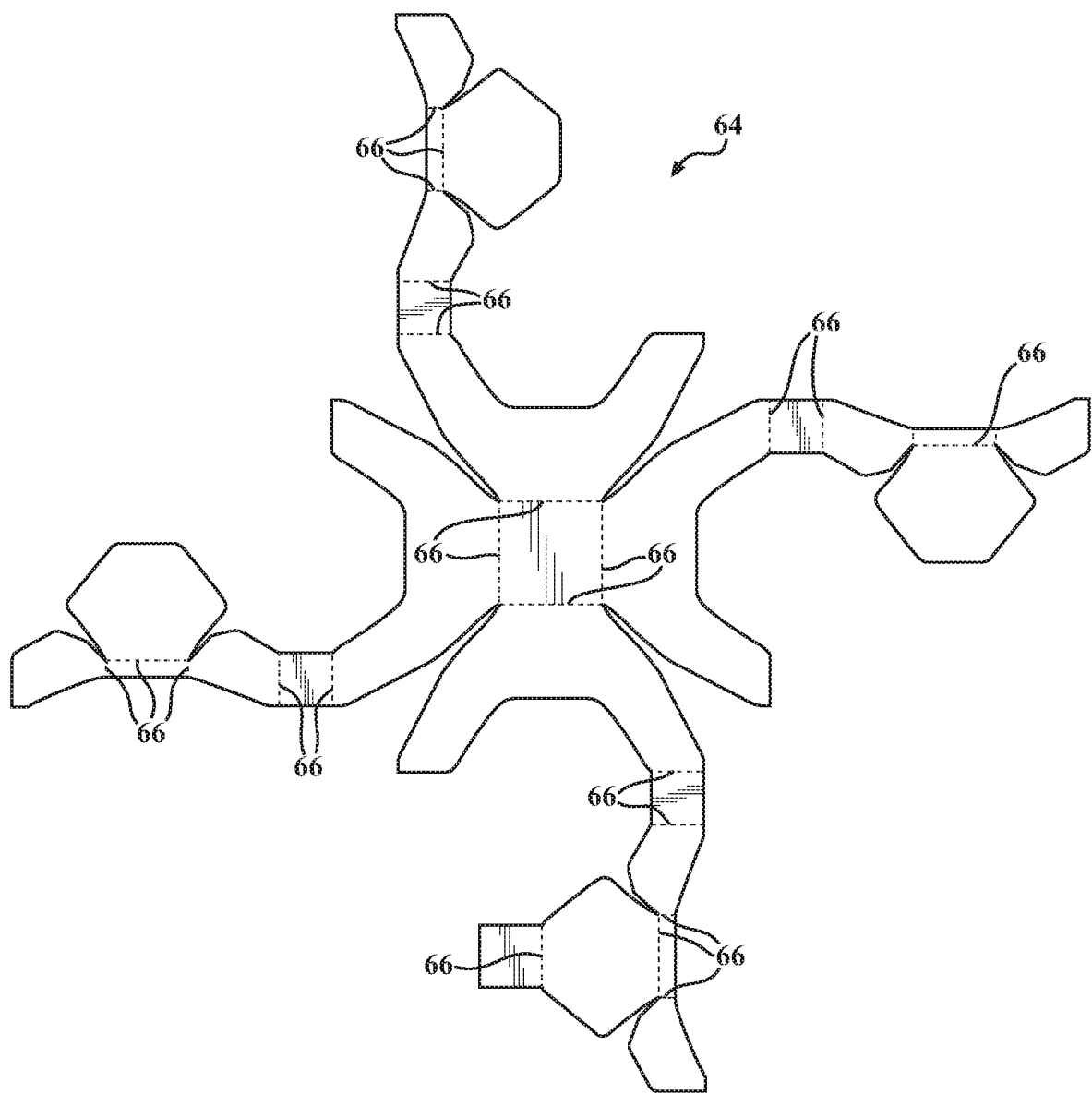
FIG. 7 illustrates an exemplary 2-D flattened pattern that can be shaped into a three dimensional structure.

As can be seen by reviewing FIGS. 5A-5D, the resulting optimized structural design has piecewise developable surfaces. For example, the various portions of the body 56, 58 and legs 60 have surfaces that can be flattened into 2-D patterns without stretching. Taking the optimized density variables directly from COMSOL Multiphysics, a surface reconstruction can first be created using a commercially available computer aided design (CAD) tool. Thereafter, with any necessary cutting, patches 62 can be developed into 2-D patterns by a flattening simulation tool, for example, as shown in FIGS. 6A and 6B. Finally, the resulting overall flattened and combined 2-D pattern 64 is presented in FIG. 7, illustrating various fold lines 66 in the exemplary 2-D flattened pattern that can be used to shape it into a three dimensional structure.

Figure 8A:
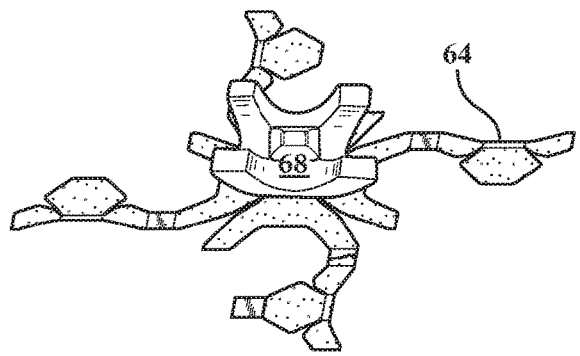
FIGS. 8A-8F provide a series of illustrations showing a 2-D pattern being shaped onto a surface of an optimized and printed solid volumetric part according to the present technology.
Figure 8B:
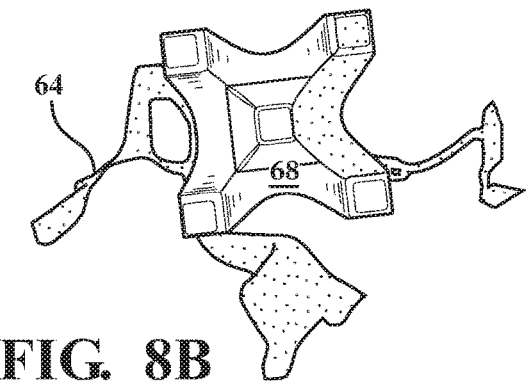
Figure 8C:
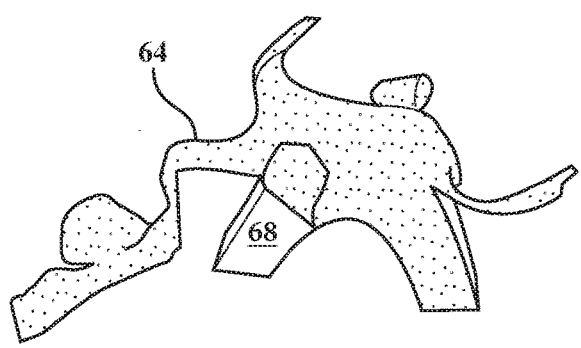
Figure 8D:
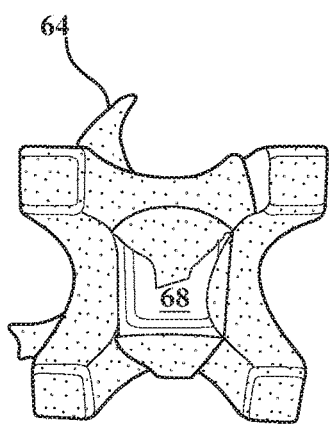
Figure 8E:
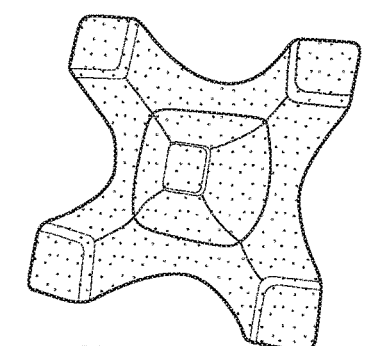
Figure 8F:
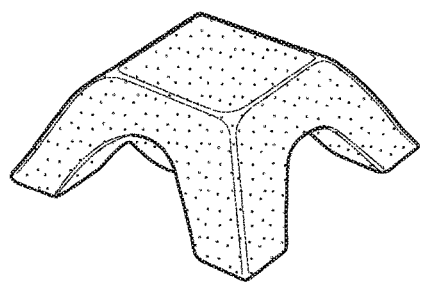

To further illustrate the example, FIGS. 8A-8D provide a series of illustrations showing a flattened 2-D pattern being shaped onto a surface of an optimized solid volumetric structure according to the present technology. In this example, the flattened 2-D pattern 64 of FIG. 7 is printed on a paper and cut. The optimized design in FIGS. 5A-5D can fabricated as a solid volumetric structure 68 using 3-D printing techniques. As demonstrated in the series of illustrations, the 2-D pattern 64 can be secured (i.e., taped or glued) to the surface of the solid volumetric structure 68 without any stretching, wrinkling, or tearing, as shown in FIGS. 8E and 8F. Notably, the similar flattened 2-D pattern 64 would not be able to be taped to the surface of the structure provided in FIGS. 4A-4D without stretching, wrinkling, or tearing.

Figure 9A:
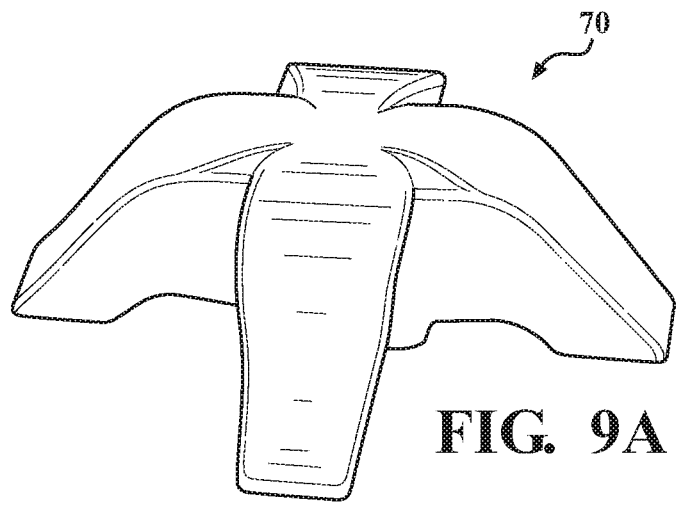
FIGS. 9A-9D illustrate an alternate improved optimized structure of FIGS. 4A-4D.
Figure 9B:
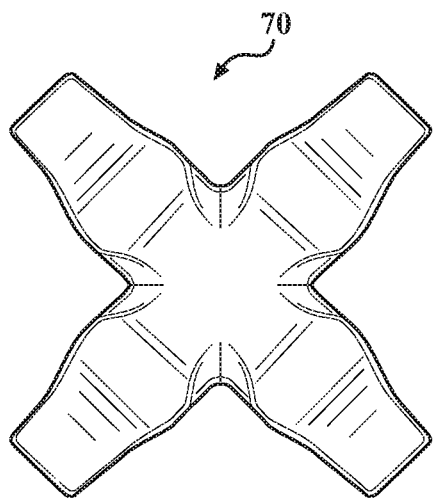
Figure 9C:
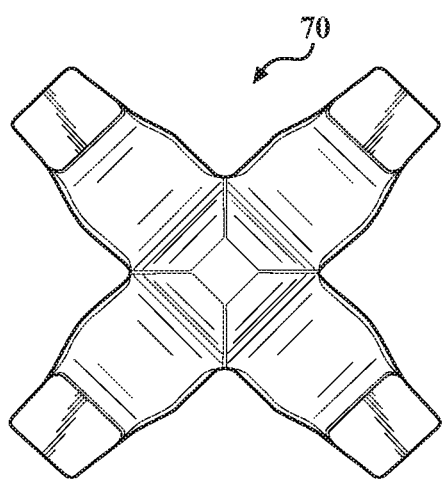
Figure 9D:
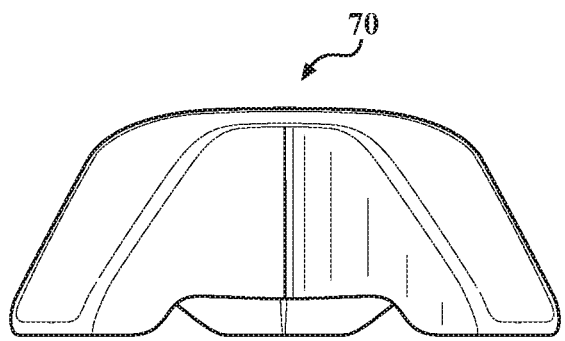

An alternate optimized structure 70 is presented in FIGS. 9A-9D. FIG. 9A is a side perspective view of the structure of the alternate optimized design; FIG. 9B is a top plan view; FIG. 9C is a bottom plan view; and FIG. 9D is a side plan view. The alternate optimized structure 70 is provided with a different set of directional vectors: $v^{(1)}=(\sqrt{2}/2, \sqrt{2}/2, 0)$ and $v^{(2)}=(\sqrt{2}/2, \sqrt{2}/2, 0)$ that are prescribed and fixed throughout the optimization. Its resulting optimized structural compliance objective is 1.06 (normalized). It is noted that the overall shape is vastly different from that of the prior two designs of FIGS. 4A-4D and 5A-5D. As the performance degradation is relatively small (<10%) compared to the benchmark design, the case with variable directional vectors is not conducted for this mechanics example.

Thermal Design Example

Figure 10:
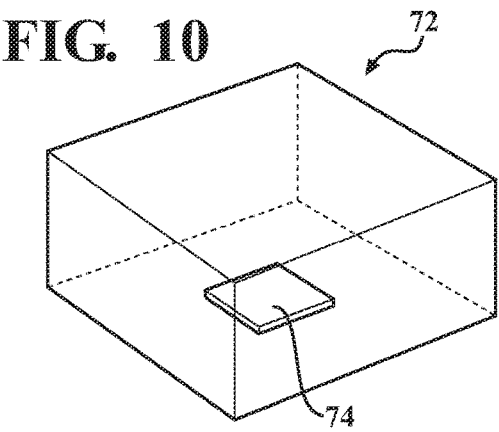
FIG. 10 is an exemplary design domain and boundary condition settings example for a thermal system example.

This second example relates to the design of a linear heat conduction system whose boundary condition and initial design domain settings are provided in FIG. 10. An exemplary dimension for the prescribed design domain, indicated by reference number 72, is 1.0 by 1.0 by 0.5. With this particular example, zero temperature is applied to a center region of the bottom surface, indicated by reference number 72, provided with a relative dimension of 0.3 by 0.3. The rest of the surface is provided as insulated. The entire design domain 72 is homogeneously heated. The system is optimized for the minimum thermal compliance under the constraint of 35% solid conductive material volume fraction.

For this example, the objective function, F, is the thermal compliance (proportional to the steady-state mean temperature), defined as $F=Q^T t$, where Q is the heat flux source, and the steady-state temperature, t, is solved by the following linear heat conduction Equilibrium Equations, collectively provided as Equation Group (13):

$$-\nabla \cdot (k\nabla t) = Q \text{ in } D$$

$$t = 0 \text{ on } \Gamma_d$$

$$(k\nabla t) \cdot n = 0 \text{ on } \Gamma_n \quad (13)$$

where $\nabla t$ is the temperature gradient, and k is the heat conduction coefficient. The domain $\Gamma_d$ is the Dirichlet boundary defined by zero prescribed temperature, and $\Gamma_n$ is the Neumann boundary defined as insulated (e.g., adiabatic). The heat conduction coefficient, k, is an effective heat conduction coefficient defined as in Equation (14):

$$k = \rho^P k_0 \quad (14)$$

where k0 is the full heat conduction coefficient for the solid conductive material, and P is the penalization parameter similar to the SIMP power law.

Figure 11A:
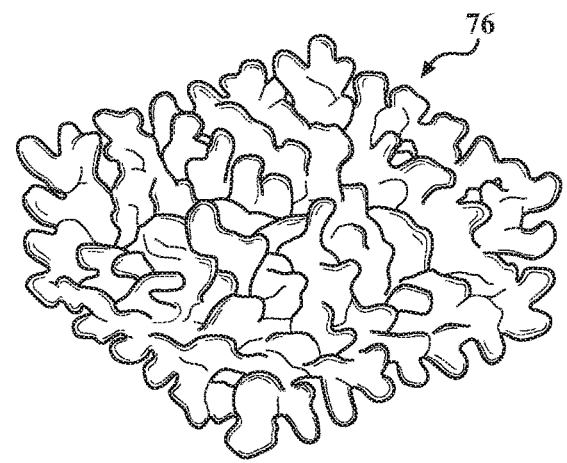
FIGS. 11A-11G illustrate an optimized benchmark design for the thermal system example of FIG. 10 using conventional topology optimization, without the developability constraint.
Figure 11B:
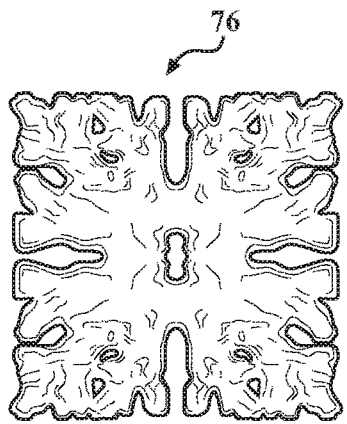
Figure 11C:
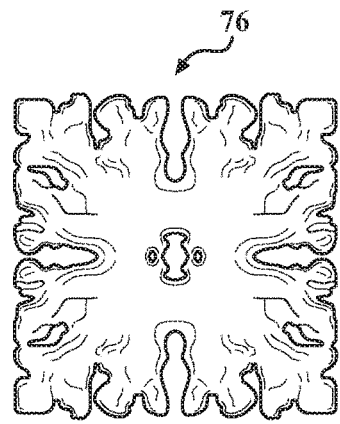
Figure 11D:
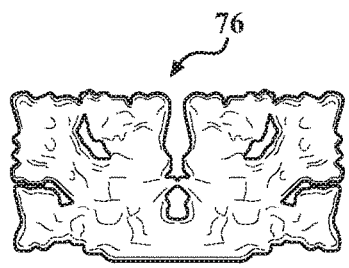
Figure 11E:
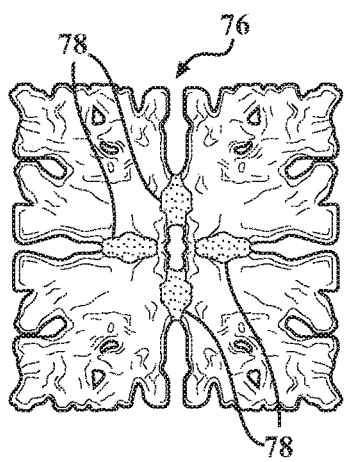
Figure 11F:
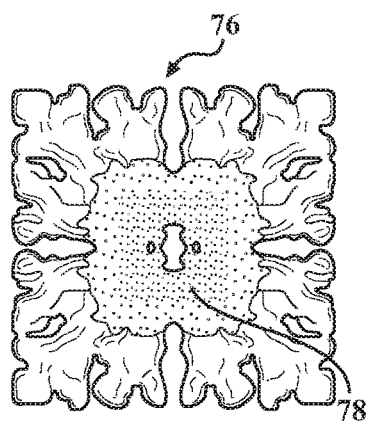
Figure 11G:
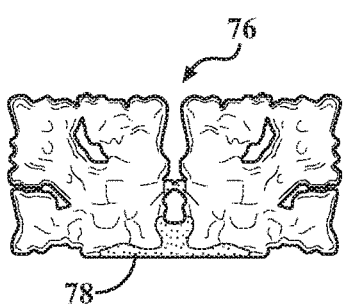

As a benchmark, the optimized design using conventional topology optimization, without the developability constraint, is presented in FIGS. 11A-11D. FIG. 11A is a side perspective view of the structure 76 of the optimized design; FIG. 11B is a top plan view; FIG. 11C is a bottom plan view; and FIG. 11D is a side plan view. The steady-state temperature distribution, t, on the optimized heat sink is also provided in FIGS. 11E-11F, with the shaded regions 78 indicating a lower temperature. For example, FIG. 11E is a top plan view; FIG. 11F is a bottom plan view; and FIG. 11G is a side plan view. The resulting thermal compliance objective is 1.0 (normalized).

Figure 12A:
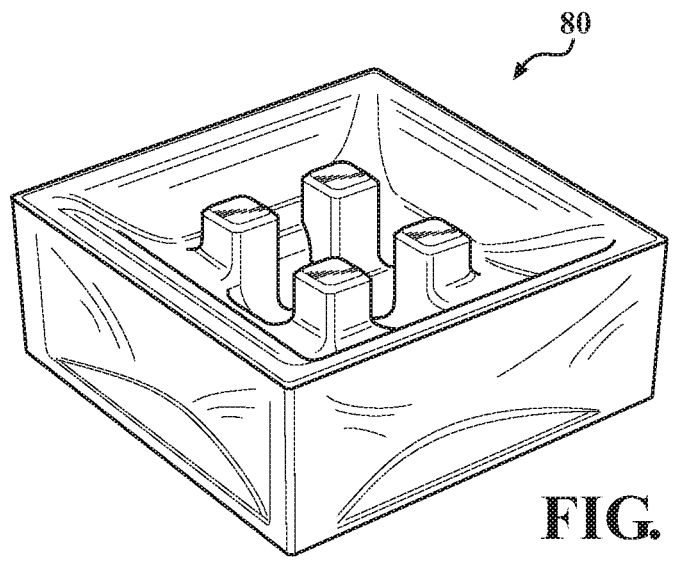
FIGS. 12A-12D illustrate an improved optimized design using a developability constraint.
Figure 12B:
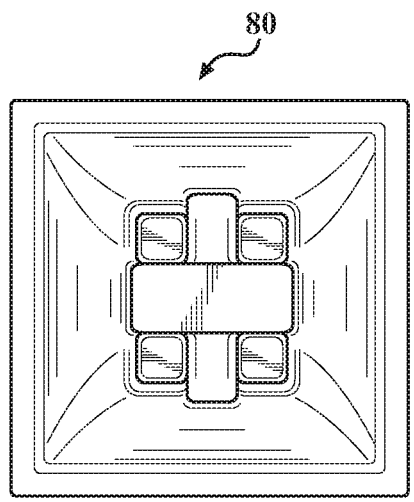
Figure 12C:
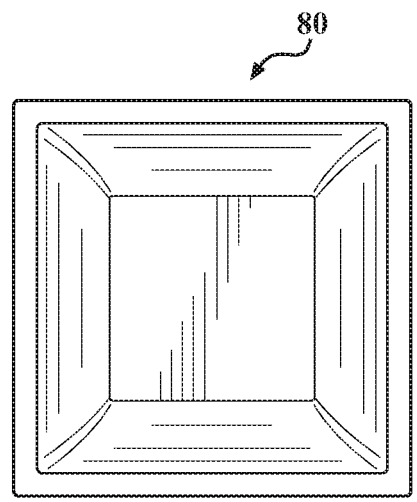
Figure 12D:
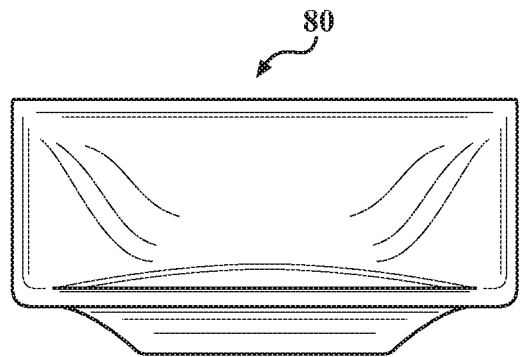

By prescribing three directional vectors $v^{(1)}=(1, 0, 0)$, $v^{(2)}=(0, 1, 0)$ and $v^{(3)}=(0, 0, 1)$ and solving Equation (9), the optimized heat sink design with the developability constraint is presented in FIGS. 12A-12D with the vectors fixed throughout the optimization. FIG. 12A is a side perspective view of the structure 80 of the optimized design; FIG. 12B is a top plan view; FIG. 12C is a bottom plan view; and FIG. 12D is a side plan view. Its thermal compliance objective is 1.19 (normalized), namely a 19% performance degradation as compared with the benchmark heat sink design, without applying the developability constraint of the present technology.

In order to further improve the target performance, the optimization model in Equation (10) can be solved with four randomly initialized directional vectors. The optimized design is presented in FIGS. 13A-13D. FIG. 13A is a side perspective view of the structure 82 of the optimized design; FIG. 13B is a top plan view; FIG. 13C is a bottom plan view; and FIG. 13D is a side plan view. Its thermal compliance objective is improved to 1.13 (normalized). While it may still be inferior to the benchmark design, without the developability constraint, it is vastly improved over the optimized design based on prescribed directional vectors. The converged directional vectors are $v^{(1)}$=(−0.34, −0.91, 0.23), $v^{(2)}$=(0.67, 0.51, 0.64), $v^{(3)}$=(0.39, −0.77, −0.51) and $v^{(4)}$= (0.79, −0.21, 0.57). It is noted that due to the nature of deterministic gradient-based optimization, the optimized design depends on the initialization of directional vectors. In this regard, a multi-start scheme may be recommended to obtain a better local solution.

Overall, the present technology proposes that surface normal directions lie on a small, finite number of planes as a sufficient condition for surface piecewise developability. Based on this feature, the surface developability constraint may be constructed and integrated into a density-based topology optimization framework. While the proposed criterion is not yet a necessary condition for surface developability (namely cones and tangent surfaces are not covered), it provides an automatic design exploration for structures with developable surfaces. The two design examples for the different physics systems (mechanics and thermal) demonstrate the effectiveness of the proposed methods. As compared to benchmark topology optimization results without the developability constraint, the new designs according to the present technology guarantee the surface piecewise developability, while sacrificing any performance objective moderately. By adopting a directional vector optimization scheme, the performance objectives can be improved over designs with prescribed directional vectors.

Further considerations regarding the present technology can be acknowledged as three separate topics. First, the proposed developability criterion is a sufficient condition for surface developability, which excludes cones and tangent surfaces. It should be understood that it may remain a challenge to provide more inclusive criteria, if not necessary and sufficient, while keeping the computational simplicity for use within gradient-based topology optimization. Second, the above-mentioned structures resulting from the proposed methods may still require additional cuts to be developable to a connected pattern in 2-D. For example, in order to ensure single-piece development without cutting, additional angle defects need to be considered during optimization. Third, the current optimized designs are solid volumetric structures with developable surfaces. While their engineering relevance to flank milling has been previously discussed, it may find more applications if the proposed methods are integrated within the topology optimization for thin-walled structures.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

What is claimed is:

1. An automated method for designing a structure with developable surfaces using a surface developability constraint, the automated method comprising:
   providing a design domain and a characteristic function of a material in the design domain to be optimized;
   defining a nodal density of the material;
   determining surface normal directions of a plurality of planes;
   determining a density gradient that describes the surface normal directions;
   performing a topology optimization process on the design domain using a surface developability constraint that is based, at least in part, on the characteristic function; and
   creating a geometric domain for the structure using results from the topology optimization, wherein the characteristic function is at least one of minimizing structural compliance and minimizing thermal compliance, and the method provides at least one of a structure for aligning composite fibers such that the composite fibers are orientated in a manner that minimizes structural compliance and a structure for optimizing a minimum thermal compliance under a constraint of a solid conductive material volume fraction, wherein the surface developability constraint is summarized with in the following equation:

$$\int_D \prod_{k=1}^{K} (v^{(k)} \cdot \nabla \tilde{\phi})^2 d\Omega = 0,$$

where D is a design domain and $\Omega$ is a material domain, further wherein the surface developability constraint is satisfied only if a surface normal direction is perpendicular to a directional vector.

2. The automated method according to claim 1, further comprising:
   using a filter to regularize a scalar design variable, $\phi$ to $\tilde{\phi}$, as provided in the following equation:

$$-R^2 \nabla^2 \tilde{\phi} + \tilde{\phi} = \phi,$$

where R is a filter radius; and
   defining the nodal density, $\rho$, by a smoothed Heaviside function $\tilde{H}$ as provided in the following equation:

$$\rho = \tilde{H}(\tilde{\phi}),$$

3. The automated method according to claim 2, wherein the nodal density is bounded between zero (0) and 1.

4. The automated method according to claim 3, wherein the plurality of planes, K, are described by directional vectors $v^{(1)}, v^{(2)}, \ldots v^{(K)}$, and the surface normal directions of density variables are computed as provided in the following equation:

$$\nabla \tilde{\phi} = \left( \frac{\partial \tilde{\phi}}{\partial x}, \frac{\partial \tilde{\phi}}{\partial y}, \frac{\partial \tilde{\phi}}{\partial z} \right).$$

5. The automated method according to claim 4, wherein the directional vectors are design variables.

6. The automated method according to claim 1, wherein the step of creating the geometric domain for the structure comprises patching together at least two geometric patterns.

7. The automated method according to claim 1, wherein the step of creating the geometric domain for the structure comprises generating a 2-dimensional design for creating a thin-walled structure.

8. The automated method according to claim 1, wherein the characteristic function is minimizing compliance.

9. The automated method according to claim 1, wherein the characteristic function is minimizing structural compliance, and the method provides a structure for aligning composite fibers such that the composite fibers are orientated in a manner that minimizes structural compliance.

10. The automated method according to claim 1, wherein the characteristic function is minimizing thermal compliance, and the method provides a structure for optimizing a minimum thermal compliance under a constraint of a solid conductive material volume fraction.

11. A non-transitory computer readable medium comprising instructions that, when executed, perform an automated method of for designing a structure with developable surfaces using a surface developability constraint, the instructions comprising:
   receiving a design domain and a characteristic function of a material in the design domain to be optimized;
   defining a nodal density of the material;
   determining surface normal directions of a plurality of planes;

determining a density gradient that describes the surface normal directions;

performing a topology optimization process on the design domain using a surface developability constraint that is based, at least in part, on the characteristic function; and creating a geometric domain for the structure using results from the topology optimization, wherein the characteristic function is at least one of minimizing structural compliance and minimizing thermal compliance, and the method provides at least one of a structure for aligning composite fibers such that the composite fibers are orientated in a manner that minimizes structural compliance and a structure for optimizing a minimum thermal compliance under a constraint of a solid conductive material volume fraction, wherein the surface developability constraint is summarized with in the following equation:

$$\int_D \prod_{k=1}^{K} (v^{(k)} \cdot \nabla \tilde{\phi})^2 d\Omega = 0,$$

where D is a design domain and $\Omega$ is a material domain, further wherein the surface developability constraint is satisfied only if a surface normal direction is perpendicular to a directional vector.

12. The non-transitory computer readable medium of claim 11, further comprising instructions of:

using a filter to regularize a scalar design variable, $\phi$ to $\tilde{\phi}$, as provided in the following equation:

$$-R^2 \nabla^2 \tilde{\phi} + \tilde{\phi} = \phi,$$

where R is a filter radius; and defining the nodal density, $\rho$, by a smoothed Heaviside function $\tilde{H}$ as provided in the following equation:

$$\rho = \tilde{H}(\tilde{\phi}),$$

13. The non-transitory computer readable medium of claim 12, wherein the nodal density is bounded between zero (0) and 1.

14. The non-transitory computer readable medium of claim 13, wherein the plurality of planes, K, are described by directional vectors $v^{(1)}$, $v^{(2)}$, ... $v^{(K)}$, and the surface normal directions of density variables are computed as provided in the following equation:

$$\nabla \tilde{\phi} = \left( \frac{\partial \tilde{\phi}}{\partial x}, \frac{\partial \tilde{\phi}}{\partial y}, \frac{\partial \tilde{\phi}}{\partial z} \right).$$

15. The automated method according to claim 14, wherein the directional vectors are design variables.

16. The non-transitory computer readable medium of claim 11, wherein the instruction of creating the geometric domain for the structure comprises an instruction for patching together at least two geometric patterns.

17. The non-transitory computer readable medium of claim 11, wherein the instruction of creating the geometric domain for the structure comprises an instruction for generating a 2-dimensional design for creating a thin-walled structure.

* * * * *